(12) United States Patent
Haag (10) Patent No.: US 10,544,046 B2
(45) Date of Patent: Jan. 28, 2020

(54) METHODS AND SYSTEMS FOR THE SYNTHESIS OF NANOPARTICLES INCLUDING STRAINED NANOPARTICLES (71) Applicant: MSMH, LLC, Des Plaines, IL (US)

(72) Inventor: Michael Allen Haag, Boulder, CO (US)

(73) Assignee: MSMH, LLC, Des Plaines, IL (US)

( * ) Notice: Subject to any disclaimer, the term of this patent is extended or adjusted under 35 U.S.C. 154(b) by 315 days.

(21) Appl. No.: 15/311,476

(22) PCT Filed: May 15, 2015

(86) PCT No.: PCT/US2015/031255
§ 371 (c)(1),
(2) Date: Nov. 15, 2016

(87) PCT Pub. No.: WO2015/176045
PCT Pub. Date: Nov. 19, 2015

(65) Prior Publication Data
US 2017/0081199 A1 Mar. 23, 2017

Related U.S. Application Data (60) Provisional application No. 61/993,779, filed on May 15, 2014.

(51) Int. Cl.
C01B 33/021 (2006.01)
C03C 17/34 (2006.01)
(Continued)

(52) U.S. Cl.
CPC ......... *C01B 33/021* (2013.01); *B01J 13/0095* (2013.01); *B01J 19/06* (2013.01);
(Continued)

(58) Field of Classification Search
CPC ..... C01B 33/021; B01J 13/0095; B01J 19/06; C03C 17/3429; C03C 2217/948;
(Continued)

(56) References Cited

U.S. PATENT DOCUMENTS 6,080,232 A * 6/2000 Sperlich ................. C01G 31/00
106/436
7,811,543 B2 10/2010 Didenko et al.
(Continued)

FOREIGN PATENT DOCUMENTS

CN 201382691 Y 1/2010
EP 1930063 A1 6/2008
(Continued)

OTHER PUBLICATIONS

Carbon Disulfide Safety Data Sheet (Sigma-Aldrich, Version 5.2), 2014 (9 pages).
(Continued)

Primary Examiner — Richard M Rump
(74) Attorney, Agent, or Firm — Dorsey & Whitney LLP (57) ABSTRACT A method for synthesizing nanoparticles includes aerosolizing a precursor solution in the presence of a flowing carrier gas to yield a reactant stream, the precursor solution comprising a volatile solvent and a nanoparticle precursor. The method further includes heating the reactant stream to a temperature above a boiling point of the volatile solvent to form a product stream comprising a plurality of nanoparticles, cooling the product stream, and passing the product stream through a collection liquid to collect the nanoparticles from the product stream.

17 Claims, 7 Drawing Sheets

US 10,544,046 B2
Page 2

(51) Int. Cl.
*B01J 13/00* (2006.01)
*B01J 19/06* (2006.01)

(52) U.S. Cl.
CPC ...... *C03C 17/3429* (2013.01); *C01P 2002/72* (2013.01); *C01P 2002/74* (2013.01); *C01P 2004/03* (2013.01); *C01P 2004/61* (2013.01); *C01P 2004/62* (2013.01); *C01P 2004/64* (2013.01); *C03C 2217/948* (2013.01)

(58) Field of Classification Search
CPC ...... B22F 9/28; B22F 1/0018; C01P 2004/61; C01P 2004/62; C01P 2002/74; C01P 2004/03; C01P 2002/72; C01P 2004/51; C01P 2006/40; C01P 2004/64; B82Y 40/00

See application file for complete search history.

(56) References Cited

U.S. PATENT DOCUMENTS

| | | | |
|---|---|---|---|
| 8,388,725 B2 * | 3/2013 | Lee | B22F 9/24 75/371 |
| 8,609,183 B2 | 12/2013 | Wang et al. | |
| 8,663,840 B2 | 3/2014 | Nazri et al. | |
| 8,865,574 B2 | 10/2014 | Haag | |
| 9,601,748 B2 | 3/2017 | Haag | |
| 2002/0037451 A1 | 3/2002 | Eguchi et al. | |
| 2004/0146784 A1 | 7/2004 | Gao et al. | |
| 2005/0272214 A1 | 12/2005 | Chiang et al. | |
| 2007/0099330 A1 | 5/2007 | Kodas et al. | |
| 2007/0111319 A1 | 5/2007 | Bastide et al. | |
| 2007/0255002 A1 | 11/2007 | Alba | |
| 2008/0041446 A1 | 2/2008 | Wu et al. | |
| 2008/0067618 A1 | 3/2008 | Wang et al. | |
| 2008/0254362 A1 | 10/2008 | Raffaelle et al. | |
| 2008/0274036 A1 | 11/2008 | Resasco et al. | |
| 2009/0114275 A1 | 5/2009 | Zaban et al. | |
| 2009/0205181 A1 | 8/2009 | Koizumi et al. | |
| 2009/0317504 A1 | 12/2009 | Rajala et al. | |
| 2010/0028249 A1 | 2/2010 | Didenko et al. | |
| 2010/0120179 A1 | 5/2010 | Zhamu et al. | |
| 2010/0148144 A1 | 6/2010 | Britton et al. | |
| 2010/0152468 A1 | 6/2010 | Kansal et al. | |
| 2010/0173198 A1 | 7/2010 | Zhamu et al. | |
| 2010/0231095 A1 | 9/2010 | Kubota et al. | |
| 2010/0265307 A1 | 10/2010 | Linton et al. | |
| 2011/0049415 A1 | 3/2011 | Lee et al. | |
| 2011/0163636 A1 | 7/2011 | Sirbuly et al. | |
| 2012/0264017 A1 | 10/2012 | Nazri et al. | |
| 2013/0045427 A1 | 2/2013 | Wang et al. | |
| 2013/0130116 A1 | 5/2013 | Ryu et al. | |
| 2013/0164626 A1 | 6/2013 | Manthiram et al. | |
| 2013/0171355 A1 | 7/2013 | Wang et al. | |
| 2013/0202961 A1 | 8/2013 | Hagen et al. | |
| 2013/0271085 A1 | 10/2013 | Chen et al. | |

FOREIGN PATENT DOCUMENTS

| | | | |
|---|---|---|---|
| EP | 2091091 A2 | 8/2009 | |
| JP | 2007534118 A | 11/2007 | |
| JP | 2008285749 A | 11/2008 | |
| JP | 2013137981 A | 7/2013 | |
| JP | 2013139371 A | 7/2013 | |
| JP | 2013182689 A | 9/2013 | |
| JP | 2013538413 A | 10/2013 | |
| WO | 2007/015250 A2 | 2/2007 | |
| WO | 2010/014979 A1 | 2/2010 | |
| WO | WO-2010014979 A1 * | 2/2010 | ............ B82Y 30/00 |
| WO | 2012075011 A2 | 6/2012 | |
| WO | 2012166529 A2 | 12/2012 | |
| WO | 2013052456 A1 | 4/2013 | |
| WO | 2013096751 A1 | 6/2013 | |

OTHER PUBLICATIONS

Characteristics and Properties of Single and Multi Walled Carbon Nanotubes (webpage obtained from https://www.azonano.com/article.aspx?ArticleID=1560), May 16, 2006 (6 pages).
First Office Action for Japanese Patent Application No. 2017-512886, dated Apr. 17, 2018, with English translation (9 pages).
Office Action for Korean Patent Application No. 10-2016-7035019, dated Mar. 20, 2018, with English translation (14 pages).
Extended European Search Report for European Patent Application No. 15792137.0, dated Jan. 4, 2018 (7 pages).
Office Action for Canadian Patent Application No. 2,949,102, dated Jan. 19, 2018 (4 pages).
Ma et al., "Multiwalled carbon nanotubes-sulfur composites with enhanced electrochemical performance for lithium/sulfur batteries," Applied Surface Science, 2014, pp. 346-350, vol. 307.
Boccaccini et al., "Electrophoretic deposition of carbon nanotubes", Carbon. vol. 44, Issue 15, 2006, pp. 3149-3160.
International Search Report and Written Opinion, International application PCT/US2015/031255, dated Aug. 10, 2015, 9 Pages.
Kennedy, Tadhg et al., "High-Performance Germanium Nanowire-Based Lithium-Ion Battery Anodes Extending over 1000 Cycles Through in Situ Formation-of a Continuous Porous Network", American Chemical Society, Nano Lett., 14(2), pp. 716-723, 2014, A-H.
Klavetter, Kyle C. et al., "A high-rate germanium-particle slurry cast Li-ion with high Coulombic efficiency and long cycle life", J. of Power Sources, 238, 2013, pp. 123-136.
Mayer, "Future of electrotechnics: ferrofluids", Advances in electrical and electronic engineering, 2008, pp. 9-14.

* cited by examiner

METHODS AND SYSTEMS FOR THE SYNTHESIS OF NANOPARTICLES INCLUDING STRAINED NANOPARTICLES

CROSS-REFERENCE TO RELATED APPLICATIONS

This application is a national stage application under 35 U.S.C. § 371 of International Application No. PCT/US2015/031255 filed on 15 May 2015 entitled "Methods and systems for the synthesis of nanoparticles including strained nanoparticles," which claims the benefit of priority pursuant to 35 U.S.C. § 119(e) of U.S. provisional application No. 61/993,779 filed on 15 May 2014 entitled "Methods and systems for the synthesis of nanoparticles including strained nanoparticles," each of which is incorporated herein by reference in its entirety, including for the purposes of PCT Rules 4.18 and 20.6.

BACKGROUND

Nanoparticles have been of much interest in a variety of applications from solar cells to diagnostic medicines to transistors. While the commercial applications of oxide nanoparticles are prevalent, e.g., nano-titania and nano-silica in sunscreens and nano-iron oxide in biomedical imaging, metal nanoparticles and nanocrystals applications have lagged behind. One significant barrier to the widespread implementation of metal nanoparticles and nanocrystals has been the production of commercial-scale qualities with specific physical properties. This is especially true for nanocrystals as their applications often prefer, if not require, high uniformity (e.g., narrow size distributions and consistent shapes).

This high uniformity is difficult to achieve with the more prevalent synthesis routes like laser ablation, sputtering, and some wet-chemistry methods. While some wet-chemistry methods can meet the narrow size distribution requirement, the large volumes of chemicals, especially solvents, required to produce the nanoparticle and the longer synthesis time significantly increase the cost and environmental impact, which in turn hinders scale-up efforts.

SUMMARY

The present disclosure relates to methods and systems for the synthesis of nanoparticles, including unique nanoparticles produced with such methods and systems.

According to one embodiment, a method for synthesizing nanoparticles is disclosed. The method may include aerosolizing a precursor solution in the presence of a flowing carrier gas to yield a reactant stream, the precursor solution comprising a volatile solvent and a nanoparticle precursor. The method may further include heating the reactant stream to a temperature above a boiling point of the volatile solvent to form a product stream comprising a plurality of nanoparticles, cooling the product stream, and passing the product stream through a collection liquid to collect the nanoparticles from the product stream.

According to another embodiment, a method of synthesizing nanoparticles is disclosed. The method may include continuously aerosolizing a precursor solution in the presence of a flowing carrier gas to yield a reactant stream, the precursor solution comprising a volatile solvent and a nanoparticle precursor. The method may further include continuously replenishing the precursor solution, heating the reactant stream to a temperature above a boiling point of the volatile solvent to form a product stream comprising a plurality of nanoparticles, cooling the product stream. The method may further include passing the product stream through a collection liquid to collect the nanoparticles from the product stream and continuously replacing the collection liquid.

According to yet another embodiment, a nanoparticle is disclosed, the nanoparticle including a Group IV element and having a shifted crystal plane peak.

According to yet another embodiment, a system for synthesizing nanoparticles is disclosed. The system may include a precursor solution vessel configured to contain a precursor solution including a volatile solvent and a nanoparticle precursor and receive a carrier gas. The system may further include an aerosolizing device for to aerosolizing the precursor solution. The system may further include a tube furnace configured to transport and heat a reactant stream comprising the aerosolized precursor solution and the carrier gas to produce nanoparticles. The system may further include a collection vessel containing a collection liquid for collecting the nanoparticles.

The features and advantages of the various embodiments will be readily apparent to those skilled in the art upon a reading of the description of the preferred embodiments that follows.

DETAILED DESCRIPTION

The present disclosure relates to methods and systems for the synthesis of nanoparticles, including unique nanoparticles produced with such methods and systems.

The methods and systems of the present disclosure may advantageously enable the high-yield production of nanoparticles (e.g., 85% or greater yield in some embodiments), and especially nanocrystals and metal nanoparticles, with narrow size distributions (e.g., ±about 2 nm in some embodiments). Further, the methods and systems described herein are capable of being adapted to relatively high-production rates (e.g., kilograms per hour) and continuous methods, which may enable industrial-scale production of highly uniform nanoparticles, including nanocrystals and metal nanoparticles.

In addition, the methods and systems described herein have been unexpectedly found to, in some embodiments, yield unique nanoparticle compositions, which may be useful in a plurality of applications including ion batteries and quantum energy devices.

It should be noted that when "about" is used herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

I. Methods and Systems for Producing Nanoparticles

Various embodiments described herein may involve producing nanoparticles by heating an aerosolized precursor solution, which in some embodiments may be adapted for continuous and high-production rate nanoparticle production.

Some embodiments may involve aerosolizing a precursor solution in the presence of a flowing carrier gas, thereby yielding a reactant stream; heating the reactant stream to form a product stream that comprises a plurality of nanoparticles; cooling the product stream; and passing the product stream through a liquid to collect the nanoparticles from the product stream. In some embodiments, the precursor solution may comprise a volatile solvent and nanoparticle precursors; and the reactant stream may be heated to a temperature above the boiling point of the volatile solvent. As used herein, the term "nanoparticle" refers to particles having at least one dimension less than about 40 μm and encompasses amorphous nanoparticles, nanocrystals, core-shell nanoparticles, non-spherical nanoparticles (e.g., oblong or rod-like particles), substantially spherical nanoparticles, hollow spherical nanoparticles, and the like.

Aerosolizing the precursor solution forms droplets that, when heated above the boiling point of the volatile solvent, may cause the volatile solvent to evaporate from the droplet and the nanoparticle precursors droplets to coalesce and react, thereby yielding nanoparticles, and in some instances nanocrystals. It should be noted that depending on the conditions of synthesis (e.g., aerosolizing parameters, reaction temperatures, volatile solvent composition, and nanoparticle precursor compositions and/or concentrations) nanoparticles may be formed by a one droplet-one nanoparticle mechanism, a ripening mechanism, a disintegration mechanism, or a combination thereof. In various embodiments, the one droplet-one nanoparticle mechanism may produce monodispersed particles (i.e., single size particles). In other embodiments, the disintegration mechanism may produce bimodal, trimodal, or other multi-modal nanoparticle size distributions. Such multimodal distributions of nanoparticles may enable higher packing efficiency when deposited in a layer on a substrate.

Figure 1:
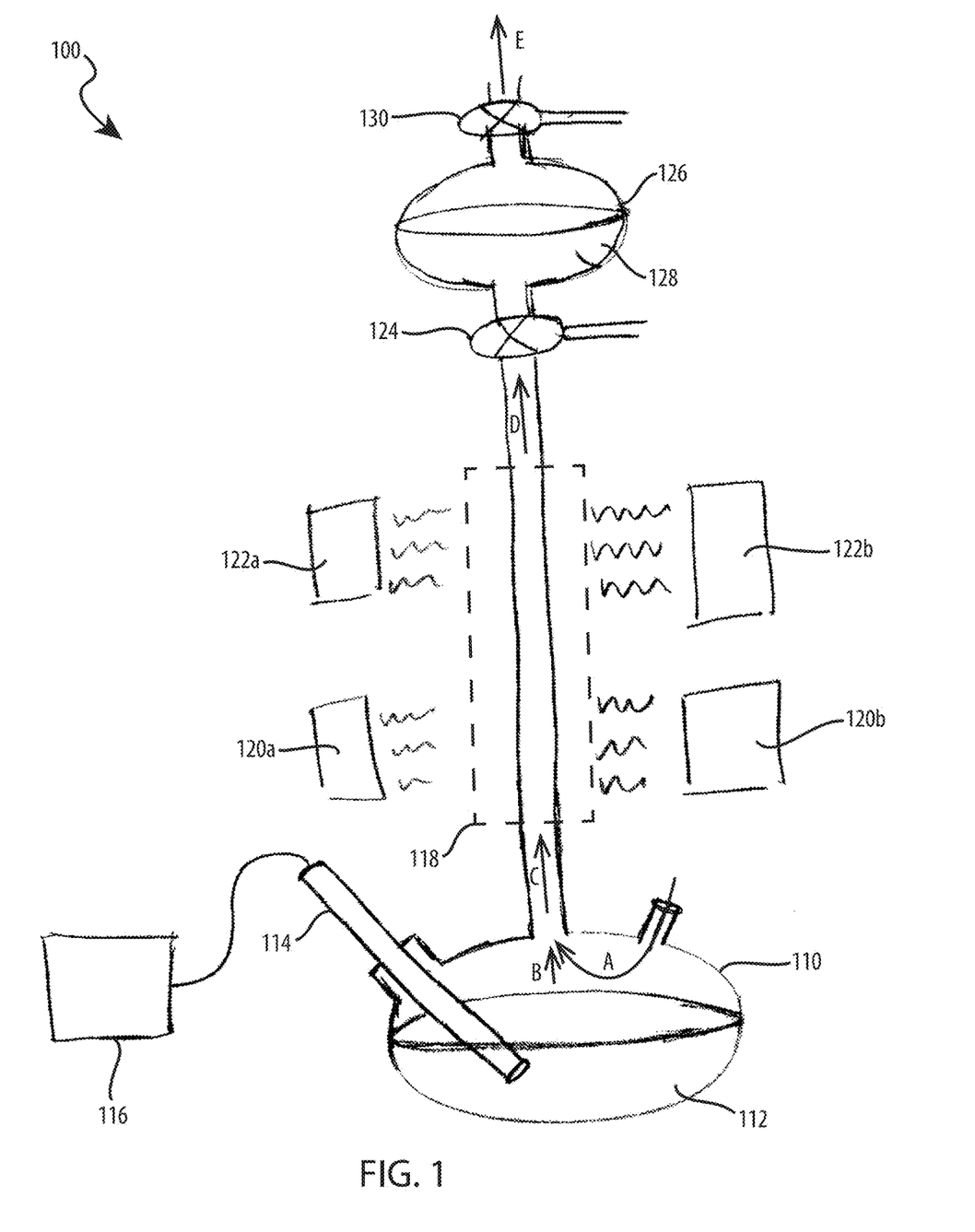
FIG. 1 is a system for producing nanoparticles.

Referring now to FIG. 1, a system for producing nanoparticles, generally designated 100, is shown. The system 100 may include a precursor solution vessel 110 that contains a precursor solution 112, which has submersed therein a sonicator 114 for producing an aerosol B. The sonicator 114 may be attached to a control box 116 that enables manipulation of the frequency, amplitude, and waveform produced by the sonicator 114. Further, the precursor solution vessel 110 has a carrier gas A passing though it, which mixes with the aerosol B to yield a reactant stream C. The reactant stream C may pass through a reaction zone 118 where the reactant stream C is heated by heaters 120a,b and 122a,b to yield a product stream D comprising nanoparticles. The heaters 120a, b and 122a, b may be adjusted to form different zones in the reaction zone C having different zone temperatures. The product stream D is then passed through a collection liquid 128 in a collection vessel 126 where the nanoparticles are at least substantially removed from the product stream D to yield an effluent stream E. As shown here, three-way valves 124 and 130 are used to control the pressure and gas flow rates through the collection vessel 126 so as to prevent the collection liquid 128 from flowing back into the reaction zone 118. It should be noted that other mechanism like vacuum and additional carrier gases introduced above the reaction zone may also be utilized to assist in preventing the collection liquid 128 from flowing back into the reaction zone 118.

In some embodiments, precursor solutions may comprise a volatile solvent and a nanoparticle precursor.

Volatile solvents may, in some embodiments, be organic solvents having a boiling point of about 300° C. or less. Examples of volatile solvents suitable for use in conjunction with the methods described herein may include, but are not limited to alcohols (e.g., methanol, ethanol, isopropanol, and butanol), glycols, acetonitrile, water, and the like, any derivative thereof, and any combination thereof. Anhydrous precursor solvents may be used to minimize oxidation of the final product. The solvent may be selected, for example, based on the dielectric constant of the solvent. In various embodiments, the dielectric constant of the solvent may be matched to the dielectric constant of organometallic precursors. In other embodiments, the solvent may be selected based on its miscibility. For example, in certain embodiments, it may be desirable to create an emulsion for use as precursor as opposed to solvents miscible with precursor that creates a solution.

Nanoparticle precursors may, in some embodiments, be organometallic compounds. Nanoparticle precursers may include silicon chloride, germanium chloride, etc. Nanoparticle precursors may comprises transition elements (e.g., titanium, chromium, iron, cobalt, nickel, copper, zinc, molybdenum, palladium, silver, cadmium, tungsten, platinum, and gold), lanthanide elements (e.g., europium, gadolinium, and erbium), Group III elements (boron, aluminum, gallium, indium, and thallium), Group IV elements (e.g., germanium, silicon, tin, lead, and carbon), Group V elements (e.g., nitrogen, phosphorous, arsenic, antimony, and bismuth), Group VI elements (e.g., oxygen, sulfur, selenium, and tellurium), or any combination thereof. Examples of nanoparticles precursors suitable for use in conjunction with the methods described herein may, in some embodiments, include, but are not limited to, tetraethylgermane, tetramethylgermane, tetraethylsilane, tetramethylsilane, diethylsilane, diethylgermane, diethyl silane, tetrapropyl germane, tetrapropyl silane and the like, any derivative thereof, or any combination thereof.

In some embodiments, more than one nanoparticle precursor may be utilized in the precursor solutions described herein. For example, a precursor solution may comprise a first nanoparticle precursor that includes germanium and a second nanoparticle precursor that includes silicon. In some embodiments, precursor solutions may comprise more than one nanoparticle precursor such that the mole ratio of the metal of the first nanoparticle precursor (e.g., germanium) to the metal of the second nanoparticle precursor (e.g., silicon) ranges from a lower limit of about 1:10, 1:5, or 1:1 to an upper limit of about 10:1, 5:1, or 1:1, and wherein the mole ratio may range from any lower limit to any upper limit and encompasses any subset therebetween. In other embodiments, when multimodal distributions are desired, pure organometallic precursors may be used in accordance with a droplet disintegration mechanism. One skilled in the art with the benefit of this disclosure should understand that the germanium and silicon example is nonlimiting and other combinations of nanoparticle precursors may be applicable, e.g., cadmium and selenium, tin and tellurium, and zinc and sulfur.

In some embodiments, the nanoparticle precursors may be present in the precursor solutions described herein in an amount ranging from a lower limit of about 20%, 30%, 40%, or 50% by volume of the precursor solution to an upper limit of about 90%, 70%, 50%, or 40% by volume of the precursor solution, and wherein the amount may range from any lower limit to any upper limit and encompasses any subset therebetween.

In some embodiments, aerosolizing the precursor solution may involve at least one of sonicating the precursor solution with the sonication probe immersed in the precursor solution (e.g., as shown in FIG. 1), nebulizing the precursor solution, passing the precursor solution through a nozzle (e.g., an aerosolizing nozzle), electrostatic precipitation, and the like, and any combination thereof.

In some embodiments, aerosolizing the precursor solution, including by any method described herein, may be performed at a frequency ranging from a lower limit of about 1 kHz, 10 kHz, 100 kHz, 1 MHz, 10 MHz, or 100 MHz to an upper limit of about 1000 MHz, 100 MHz, 10 MHz, 1 MHz, or 100 kHz, and wherein the frequency may range from any lower limit to any upper limit and encompasses any subset therebetween (e.g., 3 kHz to 150 kHz). In some embodiments, aerosolizing the precursor solution, including by any method described herein, may be performed at a frequency so as to yield strained nanoparticles (described further herein), which may be a frequency ranging from a lower limit of about 1 kHz, 3 kHz, 10 kHz, or 15 kHz to an upper limit of about 200 kHz, 150 kHz, 50 kHz, or 25 kHz, and wherein the frequency may range from any lower limit to any upper limit and encompasses any subset therebetween, e.g., 5 kHz to 22 kHz.

In some embodiments, aerosolizing the precursor solution, including by any method described herein, may be performed at an input power ranging from a lower limit of about 10 Watts (or a frequency of about 5 kHz) to an upper limit of about 100 Watts (or a frequency of about 22 kHz), and wherein the input power may range from any lower limit to any upper limit and encompasses any subset therebetween. Those skilled in the art will appreciate that additional factors relating to energy supplied to the system may also affect the physical properties of the resulting nanoparticles, such as the internal strain. Additional factors may include waveform, amplitude, heat, or any other additional energy added into the system when forming droplets at input.

In some embodiments, the aerosolized precursor solution B may be mixed with a carrier gas A to form a reactant stream C. The carrier gas A may transport the aerosolized precursor solution through the reaction zone 118. Further the flow rate of the carrier gas A may be adjusted to provide for a desired residence time of the reactant stream C in the reaction zone 118. In some embodiments, the residence time of the reactant stream C in the reaction zone 118 may range from a lower limit of about 1 sec to an upper limit of about 10 sec.

In some embodiments, the carrier gas A may be an inert gas (e.g., helium). In other embodiments, the carrier gas A may not be inert (e.g., hydrogen). Examples of carrier gases suitable for use in conjunction with the methods described herein may, in some embodiments, include, but are not limited to, hydrogen, helium, nitrogen, argon, carbon dioxide, and the like, and any combination thereof.

In some embodiments, the reactant stream C may be heated to a temperature above the boiling point of the volatile solvent so as to form a product stream D that comprises a plurality of nanoparticles. In some embodiments, the temperature above the boiling point of the volatile solvent may range from a lower limit of about 500° C., 600° C., or 700° C. to an upper limit of about 1200° C., 1100° C., 1000° C., or 900° C., and wherein the temperature may range from any lower limit to any upper limit and encompasses any subset therebetween.

In some embodiments, heating may involve passing the reactant stream C through a tube furnace, series of tube furnaces, or the like. Without being limited by theory, it is believed that nanoparticle precursors and/or nanoparticles may collect on the walls of the tube passing through the tube furnace, thereby decreasing the overall yield of nanoparticles produced. Various embodiments may minimize interaction between the walls and the reactant stream. Minimizing such interactions may, in some embodiments, involve at least one of orienting the tube furnace vertically, spinning the tube through which the reactant stream is passing, applying an electric charge to the tube, providing sheath flow within the tube furnace (e.g., flowing a sheath of a gas between the tube wall and the reactant stream), creating a vortex within the reactant stream (e.g., with a spinning or oscillating rod or the like extending into the reaction zone), using a tapered tube in conjunction with a cortex, and the like, any hybrid thereof, and any combination thereof.

Some embodiments may pass the product stream D through the collection liquid 128 so as to collect the nanoparticles therein. The collection liquid 128 may, in some embodiments, be solvents suitable for use in applications downstream of nanoparticle production (e.g., deposition on surfaces, compounding with polymers, chemical modification, and the like). Examples of the collection liquid 128 suitable for use in collecting nanoparticles produced by the methods and systems described herein may include methanol, ethanol, glycol, water, tetrahydrofuran (THF), diethylcarbonate, acetonitrile, dichlorobenzene, acetone, toluene, pentane and the like, any derivative thereof, or any combination thereof.

In some embodiments, the collection liquid 128 may further comprise suspension agents, which may, in some embodiments, assistant suspension of the nanoparticles and/or mitigate clustering of the nanoparticles. In some embodiments, suspension aids may covalently or noncovalently interact with the nanoparticles. Examples of suspension agents suitable for use in conjunction with the production of nanoparticles described herein may include surfactants, polymers, chelating agents, capping agents (e.g., octanol, oleylamine, and trioctylamine), and the like, or any combination thereof.

In some embodiments, the path that the product stream C follows from the reaction zone to the collection liquid 128 may be substantially straight (e.g., containing a bend or deviation of about 30° or less) and/or substantially vertical (e.g., about 30° or less off-vertical) to minimize the collection of nanoparticle precursors and/or nanoparticles on surfaces, thereby increasing the yield of nanoparticles. In some embodiments, the yield of nanoparticles may be about 65% or greater, about 75% or greater, or more preferably about 85% or greater (e.g., about 85% to about 90%) by weight of the metal of the nanoparticle precursor relative to the metal of the nanoparticle produced.

Figure 2:
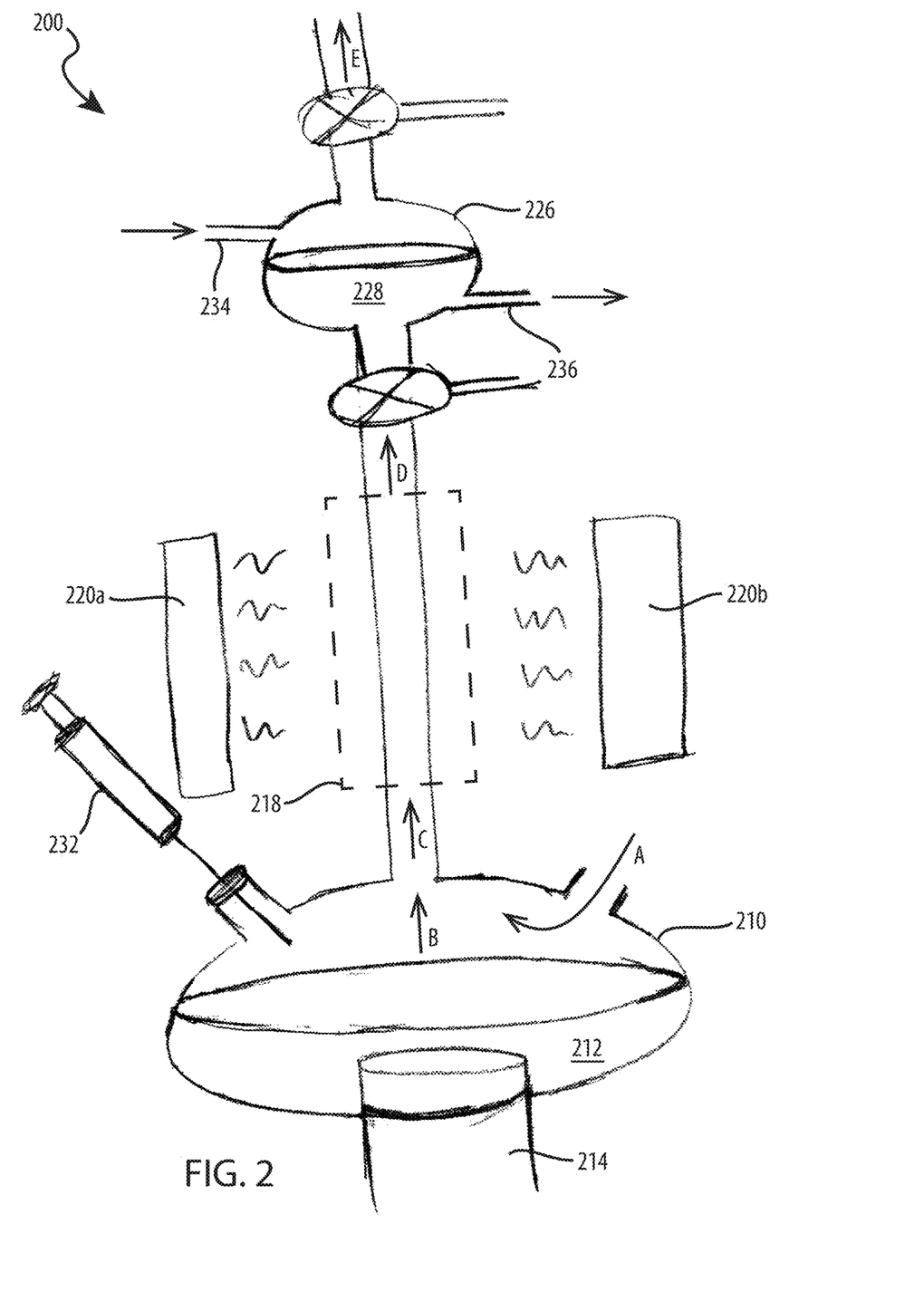
FIG. 2 is a system for producing nanoparticles.

In some embodiments, the methods and systems described herein may be adapted for continuous and high-production rate nanoparticle production. Referring now to FIG. 2, a system for producing nanoparticles, generally designated 200, is shown. The system 200 may include precursor solution vessel 210 that contains precursor solution 212. The precursor solution 212 may be in contact with an apparatus 214, e.g., a large-scale mister or fogger, capable of producing large volumes of aerosolized precursor solution B. To enable a continuous process, system 200 may include syringe pump 232 (or another similar automated addition system) for continuous addition of precursor solution 212.

Precursor solution vessel 210 has passing through it a carrier gas A, which mixes with an aerosol B to yield a reactant stream C. The reactant stream C may pass through a reaction zone 218 where the reactant stream C is heated by heaters 220a,b to yield a product stream D that comprises nanoparticles. It should be noted that the reaction zone 218 may comprise a single large diameter tube or the like as illustrated in FIG. 2 or several smaller tubes or the like in parallel to accommodate the larger processing volumes associated with the use of the solution vessel 212. The product stream D is then passed through a collection liquid 228 in a collection vessel 226 where the nanoparticles are at least substantially removed from the product stream D to yield an effluent stream E. As shown, the collection vessel 226 may comprise an inlet 234 and an outlet 236 for continuous flow of the collection liquid 228 to enable continuous extraction of the nanoparticles produced in this or a similar process.

As used herein, the term "continuous" refers to being without interruption for a prolonged time frame (e.g., about 3 hours or greater). It should be noted that continuous actions may be performed intermittently over the short-term (e.g., seconds to minutes) and still be considered continuous over the long term. For example, continuous addition of precursor solutions may include the intermittent addition of precursor solutions over a prolonged time frame, e.g., the addition of about 1 mL of precursor solution every 15 minutes.

Some embodiments may continuously aerosolize a precursor solution 212 in the presence of a flowing carrier gas A, thereby yielding a reactant stream C; continuously replenishing the precursor solution 212; heating the reactant stream C to a temperature above a boiling point of the volatile solvent so as to form a product stream D that comprises a plurality of nanoparticles; cooling the product stream D; and passing the product stream D through a collection liquid 228 so as to collect the nanoparticles from the product stream.

Some embodiments may further involve continuously replacing the collection liquid 228, e.g., when the nanoparticles have reached a desired concentration therein.

Some embodiments may further involve extracting the nanoparticles from the collection liquid 228 (e.g., continuously or batchwise). In some embodiments, extracting the nanoparticles from the collection liquid 228 may involve centrifuging, continuous centrifuging (e.g., flow centrifugation), filtering, concentrating the nanoparticles, decanting the collection liquid after having allowed the nanoparticles to settle, and the like, and any hybrid thereof II. Nanoparticles In some embodiments, the methods and systems described herein may form unstrained nanoparticles and/or strained nanoparticles. For example, in a bimodal distribution larger nanoparticles may form having strain, while smaller nanoparticles may have negligible strain. As used herein, the term "strained nanoparticles" refers to nanoparticles having a strained crystal structure, which can be determined by a shift in a crystal plane when analyzed by x-ray diffraction ("XRD"). In some embodiments, the strained nanoparticles may be nanocrystals, core-shell nanoparticles with a crystalline core and an amorphous shell, SiGe core shell nanoparticles, and the like. It should be noted that, unless otherwise specified, the term "nanoparticle" encompasses both unstrained nanoparticles and strained nanoparticles.

Without being limited by theory, it is believed that the frequency of aerosolization, the amplitude of aerosolization, residence time in the reaction zone, and temperature affect the degree of strain, diameter distribution, and/or the morphology of the nanoparticle formed by the systems and processes described herein. For example, the use of higher frequencies during aerosolization may yield larger nanoparticles. In another example, the use of higher amplitudes during aerosolization may yield nanoparticles with higher strain.

The nanoparticles (strained or unstrained) may comprise the metal(s) of the nanoparticle precursor(s) used in the production of the nanoparticles. For example, the methods and systems described herein may utilize a precursor solution comprising cadmium and selenium may yield cadmium selenide nanoparticles. In another example, the methods and systems described herein may utilize a precursor solution comprising gold, platinum, or palladium so as to yield gold, platinum, or palladium nanoparticles. In yet another example, methods and systems described herein may utilize a precursor solution comprising germanium and silicon in a desired ratio so as to yield nanoparticles comprising germanium and silicon at about the desired ratio.

Strained nanoparticles may, in some embodiments, comprise Group III, Group IV, Group V, and/or Group VI elements. For example, a strained silicon nanoparticle may have a $2\theta$ value for the (111) crystal plane shifted by about 4° to about 6° from the (111) crystal plane of bulk silicon. In some embodiments, the $2\theta$ value for the (111) crystal plane of the strained nanoparticles may shift relative to the corresponding bulk material from a lower limit of about 1°, 2°, or 3°, or 4° to an upper limit of about 8°, 7°, 6°, 5°, or 4°, and where the shift may range from any lower limit to any upper limit and encompasses any subset therebetween.

In some embodiments, the strained nanoparticles may comprise Group IV elements (e.g., germanium, silicon, tin, lead, carbon, or any combination thereof). In other embodiments, the strained nanoparticles may comprise a mole ratio of silicon to germanium that ranges from a lower limit of about 1:10, 1:5, or 1:1 to an upper limit of about 10:1, 5:1, or 1:1, and wherein the mole ratio may range from any lower limit to any upper limit and encompasses any subset therebetween.

In some embodiments, the nanoparticles (strained or unstrained) described herein may have an average diameter in at least one dimension ranging from a lower limit of about 3 nm, 5 nm, 10 nm, 25 nm, or 100 nm to an upper limit of about 1000 nm, 500 nm, 250 nm, 150 nm, 100 nm, or 50 nm, and wherein the average diameter in at least one dimension may range from any lower limit to any upper limit and encompasses any subset therebetween.

In some embodiments, the nanoparticles (strained or unstrained) described herein may have a narrow diameter distribution such that the standard deviation from the average diameter ranges from a lower limit of ±about 0.5 nm, 1 nm, or 2 nm to an upper limit of ±about 10 nm, 7 nm, or 5 nm, and wherein the standard deviation may range from any lower limit to any upper limit and encompasses any subset therebetween.

In some embodiments, the nanoparticles (strained or unstrained) described herein may have a multimodal diameter distribution (e.g., bimodal, trimodal, and so on). In some embodiments, the nanoparticles (strained or unstrained) described herein having a multimodal diameter distribution may have at least one mode with an average diameter in at least one dimension ranging from a lower limit of about 4 nm, 7 nm, 12 nm, or 25 nm, to an upper limit of about 250 nm, 150 nm, 100 nm, or 50 nm, and wherein the average diameter in at least one dimension may range from any lower limit to any upper limit and encompasses any subset therebetween.

In some embodiments, the modes of a multimodal diameter distribution of the nanoparticles (strained or unstrained) described herein may independently have a narrow diameter distribution such that the standard deviation for each mode independently ranges from a lower limit of ±about 0.5 nm, 1 nm, or 2 nm to an upper limit of ±about 10 nm, 7 nm, or 5 nm, and wherein the standard deviation may range from any lower limit to any upper limit and encompasses any subset therebetween.

In some embodiments, the nanoparticles may produce photoluminescence based on the size of the nanoparticles. When the physical size of a particle is less than its exciton radius (i.e., physical distance an electron must travel from its valence band to conduction band), the quantum phenomenon of photoluminescence can be observed. For example, the exciton radius of silicon is 24 nm. That is, an electron must travel 24 nm from its valence band to the conduction band. However, various embodiments may produce silicon particles that are less than 24 nm, (e.g., it is possible to synthesize 5 nm silicon particles). In such embodiments, when a photon of sufficient energy (i.e., ultraviolet light or, more specifically, a photon greater than the band gap energy of the nanoscale material) is absorbed by the nanoparticle, an electron is excited from the valence band to the conduction band. The electron may then fall back into the valence band and emit a photon of light at a wavelength based on the difference between the particle size and the exciton radius. In the case of 5 nm silicon, it is blue light. As the physical size of the particle approaches the exciton radius, photoluminescence is no longer observed and the material begins to behave as a bulk material.

In various embodiments, the diameter of the nanoparticles may be determined based on the relationship $$D_p = \sigma*(f)^{-0.66}(Q)^{0.207}(Y)^{0.11}(\rho)^{-0.274}(\eta)^{0.166}(\text{power/area})^{-0.4}$$

where $D_p$ is the diameter of the resulting particles, σ is a constant which depends on temperature and choice of precursor solution, f is the transducer/sonicating frequency, Q is the flow rate of the carrier gas, Y is the surface tension of the precursor, ρ is the density of the precursor, η is viscosity of the precursor, and power/area is the power density.

III. Piezoelectric Effects of Strained Nanoparticles

In some embodiments, the strained nanoparticles may exhibit piezoelectric effects. Piezoelectricity is the special circumstance of electrical charge build-up that arises in certain solid material structures due to mechanical stress. Generally, the piezoelectric effect has been experimentally determined to be a linear electromechanical interaction between the mechanical and the electrical state in crystalline materials with no inversion symmetry. The piezoelectric effect is a reversible process such that the internal generation of electrical charge resulting from an applied mechanical force can be reversed with the internal generation of a mechanical strain resulting from an applied electrical field.

Regarding the piezoelectric effect in bulk semiconductors, changes in inter-atomic spacing resulting from strain affects the semiconductors intrinsic band gap making it easier (or harder depending on the material and strain) for electrons to be raised into the conduction band. The piezoelectric effect of semiconductor materials can be several orders of magnitudes larger than the analogous geometrical effect in metals and is present in materials like germanium, polycrystalline silicon, amorphous silicon, silicon carbide, and single crystal silicon.

The piezoelectric effects of semiconductors have been used for sensor devices with a variety of semiconductor materials such as germanium, polycrystalline silicon, amorphous silicon, and single crystal silicon. Since silicon is currently the material of choice for nearly all integrated circuits, the use of piezoelectric silicon devices has been an intense area of research interest.

Regarding the piezoresistive effect in bulk single crystal silicon and germanium, the resistance of silicon and germanium can change due to a stress-induced change of geometry, but also due to the stress dependent resistivity of the material. The resistance of n type silicon (predominant charge carriers responsible for electrical conduction are electrons) mainly changes due to a shift of the three different conducting vertices of the crystal. The shifting causes a redistribution of the carriers between vertices with different mobilities. This results in varying mobilities dependent on the direction of current flow. A minor effect is due to the effective mass change related to shape distortion due to change in the inter-atomic spacing of valley vertices in single crystal silicon. In p-type silicon (predominant charge carriers responsible for electrical conduction are holes) the phenomena currently being researched are more complex and also demonstrate changes in mass and hole transfer.

Regarding the piezoelectric mechanism, the nature of the piezoelectric effect is rooted in the occurrence of electric dipole moments in solids. An electric dipole moment is a vector quantity equal to the product of the magnitude of charge and the distance of separation between the charges. Electric dipole moments in solids may either be induced for ions on crystal lattice sites as in an asymmetric charge environment such as in lithium tantalate and lead zirconate-titanate or may be directly carried by molecular groups such as in organic sugar molecules. The dipole density causing polarization is the sum of the dipole moments per unit volume of a crystal unit cell. Since electric dipoles are vector quantities (geometric objects of specific magnitude and direction), the dipole density P is also a vector quantity. Dipoles near each other tend to be aligned in regions called Weiss domains. In these aligned regions occurring between individual particles, the particles act as a whole. Thus, the potential and polarity of voltage and magnitude and direction of the current is equal to the sum of all individual particles making up the entire solid.

To reiterate, typically the piezoelectric effect occurs with an applied mechanical stress but can also be manifested by manufacturing internal stress into certain solids. Piezoelectricity arises because of variation of the polarization strength, direction, or both. The magnitude and direction of the charge depends on the interrelationships between the orientation of its dipole density P within individual particles, particle symmetry, and the applied mechanical stress or induced internal stress. Although the change in an individual crystal's dipole density appears quantitatively as a variation of surface charge density upon the individual crystal faces, the overall useful energy arising from the piezoelectric phenomenon is caused by the superposition of the dipole densities of the crystals that make up the entire piece of material, i.e., as a sum of the individual crystallographic unit cells that make up a whole crystal. For example, a 1 cm³ cube of quartz with 500 lb of mechanically applied force at the right point can produce a voltage of about 12500 V because the resultant force is the sum of all the individual crystallographic unit cells that make up the whole crystal.

Regarding power generation in bulk polar crystal structures synthesized in a state of stress, there are 32 crystal classes that represent 32 possible combinations of symmetry operations in crystalline materials. Each crystal class includes crystal faces that uniquely define the symmetry of the class. Of the thirty-two crystal classes, twenty-one are non-centrosymmetric (not having a centre of symmetry), and of these, twenty exhibit direct piezoelectricity. Ten of these include the polar crystal classes, which show a spontaneous polarization without an applied mechanical stress due to a non-vanishing electric dipole moment associated with asymmetry inherent in their crystal structure. For polar crystals, for which the summation of the dipole density $P \neq 0$ holds without applying a mechanical load, the piezoelectric effect manifests itself by changing the magnitude or the direction of P or both. Stated another way, polar crystals that can be manufactured to have internal stress will demonstrate a piezoelectric effect without an applied mechanical load.

Restated another way, for non-polar piezoelectric crystals, an applied mechanical load transforms the material from a non-polar crystal class (P=0) to a polar one, having $P \neq 0$ and hence gives rise to a voltage potential and useful energy capable of powering an external device. However, crystals predisposed to an internal state of stress have an inherent polar structure for which $P \neq 0$ and hence energy can be discharged from the structure without an applied mechanical load. During discharge of electrical energy, the crystal relaxes back into its preferred state of interatomic spacing.

In various embodiments, producing strained nanocrystals depends on a variety of factors including, for example, the composition of the nanocrystals, the temperature(s) of the reaction zone(s), the frequency and power of the sonicator/mister/fogger/transducer, among other factors. In one embodiment, strained Si nanocrystals may be produced in a three stage reaction zone, where the three stages have temperatures of 850° C., 850° C., and 650° C., and the power supplied by the sonicator is greater than 175 W and less than 700 W. In another embodiment, strained germanium nanocrystals may be produced in a three stage reaction zone, where the three stages have temperatures of 750° C., 750° C., and 550° C., and the power supplied by the sonicator is greater than 462 W and less then 700 W. In yet another embodiment, SiGe nanocrystals may be produced in a three stage reaction zone, where the three stages have temperatures of 800° C., 800° C., and 575° C., and the power supplied by the sonicator is greater than 390 W and less than 700 W.

In addition to producing strained nanoparticles, various embodiments enable production of quantum confined nanoparticles, which allows for increased energy density in a quantum energy device (QED) produced with the nanoparticles. Quantum confinement in nanocrystals occurs when the physical size of the particle is less than its characteristic exciton Bohr radius. The exciton Bohr radius is the physical distance separating a negatively charged electron from its positively charged hole left behind during excitation. When the physical size of the particle is less than the distance the electron must travel during excitation, the material is considered to be quantum confined. For example, the exciton Bohr radius for germanium is 24.3 nm; however, it is possible to synthesize germanium nanocrystals to be 1 nanometer in diameter. By creating nanoparticles smaller than this characteristic distance, the electronic properties of the nanoparticles can be tuned to discreet energy levels by adjusting particle size. Thus, an aggregate made of particles smaller than the Bohr radius will enjoy a greatly increased energy density. If the particles are about the same size as the Bohr exciton radius, or even a little larger, an aggregate of the particles will still enjoy increased energy density, if not to the same degree as if all of the particles were smaller than the exciton Bohr radius.

Nanoparticles produced according to embodiments of this disclosure also benefit from shallow potential wells and therefore require less activation energy than larger particles to excite electrons from the valence band to the conduction band by virtue of quantum tunneling. Potential wells are a direct result of synthesizing physical particle dimensions to be smaller than their respective exciton Bohr radius. A potential well is the region surrounding a local minimum of potential energy in nanomaterials. Energy captured in a potential well is unable to convert to another type of energy because it is captured in the local minimum of the potential well. Therefore, a body may not proceed to the global minimum of potential energy, as it naturally would, according to the universal nature of entropy. Energy may be released from a potential well if sufficient energy is added to the system such that the local minimum energy for excitation is sufficiently overcome. However, in quantum physics potential energy may escape a potential well without added energy due to the probabilistic characteristics of quantum particles. In these cases, a particle may be imagined to tunnel through the walls of a potential well without energy added to the system.

Figure 3:
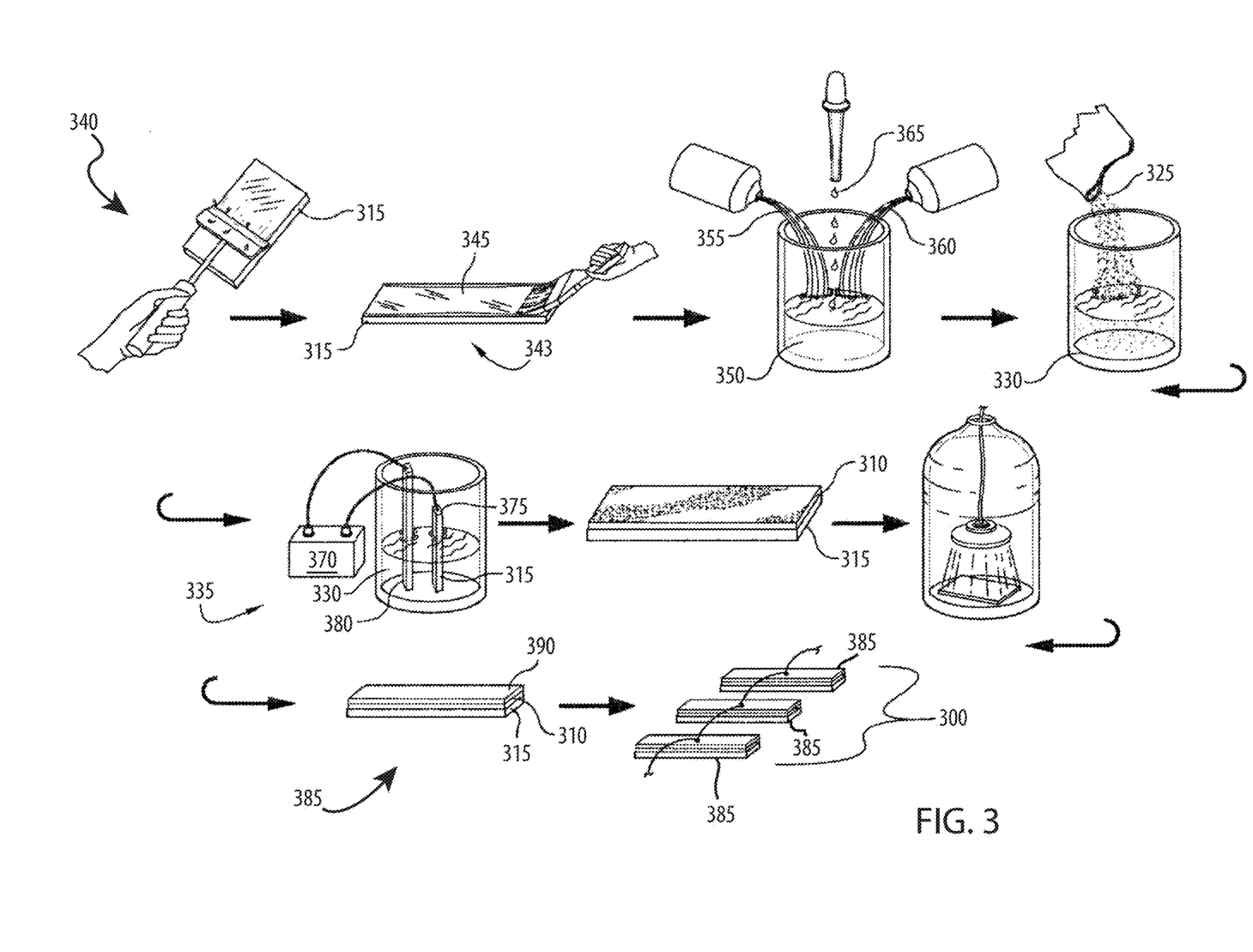
FIG. 3 is a process chart illustrating the fabrication of one or more devices that comprise nanoparticles.

FIG. 3 illustrates a method of producing a nanoparticle coating or film 310 on a substrate 315 under conditions of ambient atmospheric composition and pressure. The embodiment of FIG. 3 may also be performed at ambient or slightly elevated temperature. The embodiment of FIG. 3 includes electrophoretically depositing nanoparticles 325 from a nonaqueous colloidal suspension 330 and substantially uniformly depositing 335 the nanoparticles 325 onto the substrate 315. The coating or film 310 may, in some embodiments, be less than 1000 nanometers in thickness, but may be thicker in other embodiments. A substrate 315 desired to be coated may be prepared by first cleaning 340 the substrate 315, and then, if the substrate 315 is not sufficiently electrically conductive, coating 343 the substrate 315 with a layer of conductive material 345, such as silver or indium tin oxide (typically used to prepare optical elements, since thin layers of indium tin oxide are substantially optically transparent).

A nonaqueous suspension 330 of nanoparticles 325 may be prepared or provided from the synthesis of the nanoparticles (e.g., the nanoparticles in the collection liquid as described herein), for use in the deposition process. The liquid suspension medium 350 (or collection liquid depending on the embodiment) may be a polar solvent, such as 2-butanol, 1,2-dichlorobenezene and/or acetone, or the like. The liquid suspension medium 350 composition is selected taking into account such properties as its inherent dielectric constant, Hamaker constant, miscibility, viscosity, and the like. In various embodiments, a blend of aprotic polar nonaqueous solvents 355 and protic polar nonaqueous solvents 360 is selected to define the liquid suspension medium 350.

In some embodiments, small amounts of an ionic liquid 365, such as 1-butyl-methylpyrrolidinium bis(trifluoromethylsulfonyl)imide may be added to the liquid suspension medium 350 (or collection liquid depending on the embodiment) to facilitate deposition of nanoparticle films 310.

In some embodiments, a buffer solution (not shown) may be added to the liquid suspension medium 350 (or collection liquid depending on the embodiment) to manage the surface charge on the nanoparticles 325. For example, silicon particles are negatively charged in the pH range between about 6 and about 9 while germanium particles are negatively charged in the pH range from about 3 to about 5.

Regarding preparing a nanoparticle suspension, a predetermined and measured amount of nanoparticles 325 may be dispersed in the liquid suspension medium 350 (optionally including the ionic liquid 365 and/or a buffer solution (not shown)). The liquid suspension medium 350 may be agitated until the nanoparticles 325 are generally evenly and homogeneously dispersed to define a colloidal suspension 330.

The substrate 315 connected to a DC power source 370 may serve as a cathode 375 while a second electrode or electrode array 380 (such as a carbon electrode) immersed the colloidal suspension 330 may be used to complete an electric circuit and establish an electric field. The substrate 315 is typically the cathode 375 and the carbon electrode is typically the anode 380. The electrodes/electrode arrays 375, 380 may be, for example, maintained at a distance of between about 0.5 and about 4.0 centimeters apart, depending upon such variables as the desired deposition pattern, the shape of the electrodes 375, 380, the shape of the substrate 315, and the like. However, under certain circumstances the electrode separation distance may fall outside of the 0.5 to 4.0 centimeter range. The applied voltage is typically between about 3 and about 12 volts, depending on the nanoparticle size. The nanoparticles 325 in the colloidal suspension 330 electrophoretically migrate to the substrate 315, forming a substantially even coating 310 thereupon.

The nanoparticles 325 may, in some embodiments, be of any convenient shape and geometry, and are generally regularly shaped and are typically blocky, and, more typically, generally spherical. Typically, the nanoparticles 325 will be tightly sized, having a relatively narrow diameter distribution, to yield a coating or film 310 of nanoparticles 325 having a narrow diameter distribution, such as, for example, wherein most of the nanoparticles 325 fall in the 3-10 nanometer range. Alternately, the applied voltage, current and/or the pH of the colloidal suspension 330 may be varied to yield similar control over the size of the deposited nanoparticles 325 when the colloidal suspension 330 includes a substantial amount of nanoparticles 325 falling outside the target size range. Further, by varying the applied voltage and/or the pH of the colloidal suspension 330, multiple layers of nanocrystals may be applied to a substrate 315 in a predetermined, size-specific of graduated order. The deposition process 335 may be continued until the desired film thickness is achieved, typically for about 30 seconds to about 5 minutes to yield a deposited layer typically from a few hundred to a few thousand nanometers thick. Typically, the deposition process 335 is conducted under ambient atmosphere; no vacuum is required.

The effective surface area of the film 310 is a function of the nanocrystalline particle size and shape and is governed by the desired end use and does not change the method of deposition. Likewise, there is no requirement that the electrode or electrode array 380 be of equal or larger size than the cathode 375 that the nanoparticles will be deposited upon.

Once electrophoretic deposition 335 of the nanoparticles 325 is complete, a coated substrate 385 may be finished by depositing a metal contact 390 via thermal evaporation or the like over the film 310 to protect the nanoparticle film 310 and establish a pathway for electrons to travel to be used to power an external device. The metal contact 390 is typically a highly electrically conductive metal, such as gold, platinum, silver, copper or the like, and is typically, but not limited to, between about 100 nm and about 400 nm thick.

Using standard electrical connection techniques, multiple coated substrates 85 may be connected in a series/parallel fashion to yield a quantum energy device 300 configured to generate the desired voltage/current supply configuration. In some embodiments, a QED can be completed and configured to power a desired load.

Figure 4:
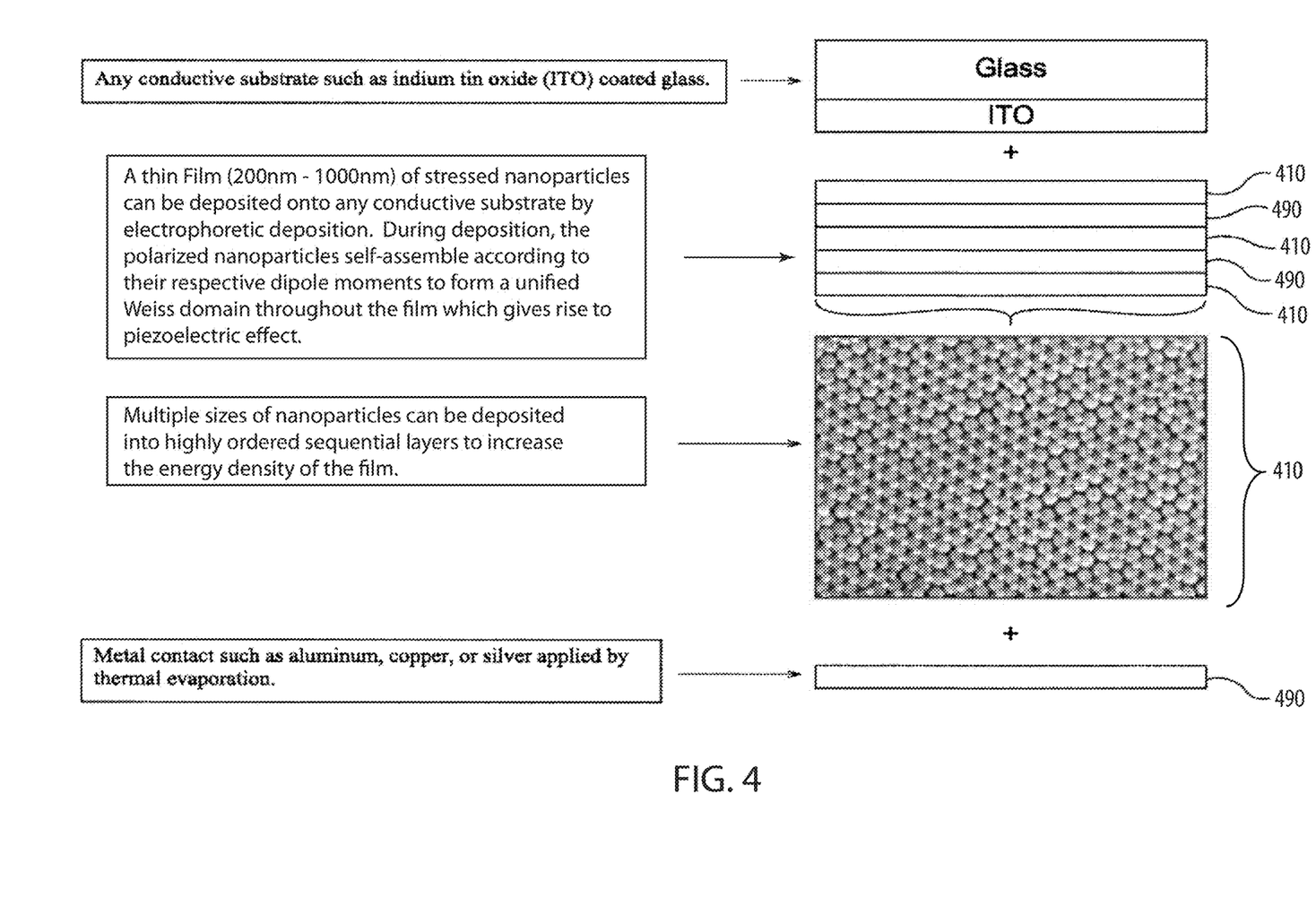
FIG. 4 is a diagram illustrating the layers of a coated substrate comprising nanoparticles.

Referring now to FIG. 4, in some embodiments, a plurality of nanoparticle films 410 and metal contacts 490 may be deposited in series to yield coated substrates having a plurality of layers. As shown in FIG. 4, the nanoparticles of films 410 may have a bimodal diameter distribution and form highly-ordered films 410 by electrophoretic deposition.

Figure 5:
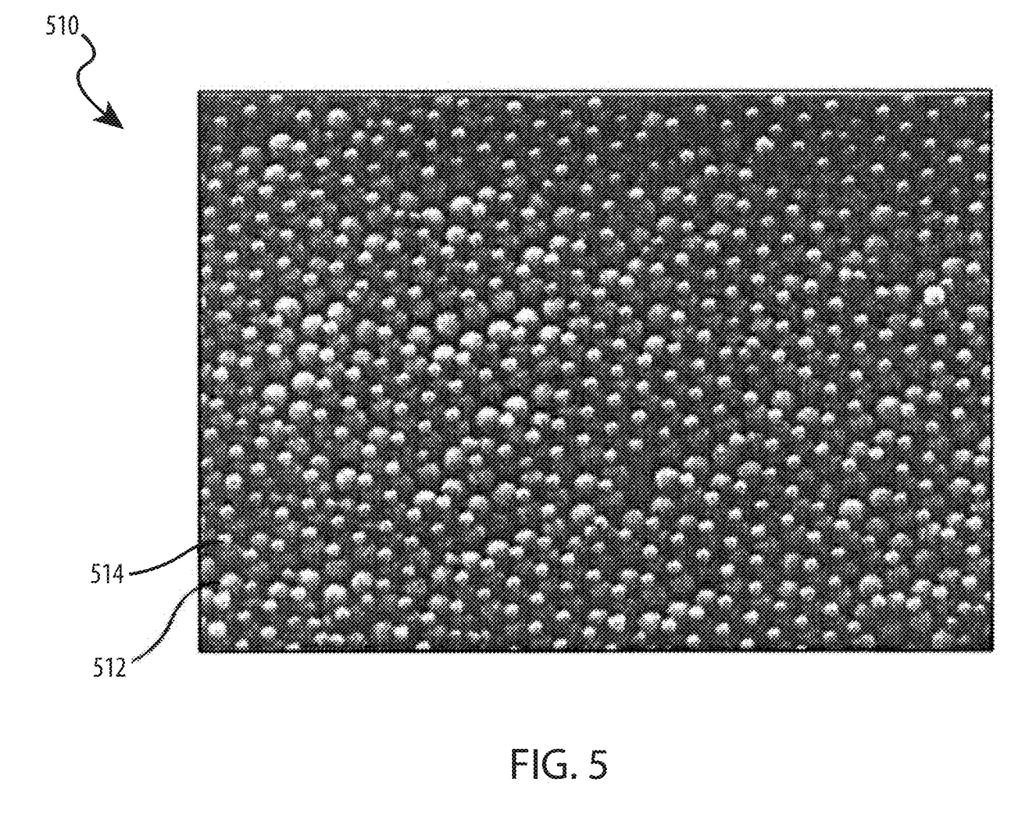
FIG. 5 is a scanning electron micrograph of a layer of smaller (9 nm) silicon nanocrystals deposited over a layer of larger (25 nm) silicon nanocrystals.

Referring now to FIG. 5, the nanoparticle film 510 may, in some embodiments, be formed from a solution of nanoparticles having a multimodal diameter distribution. Such a multimodal diameter distribution may, in some embodiments, yield high energy storage and/or power transduction/generation/supply characteristics in the resultant QED.

In some embodiments, the nanoparticles are provided in a predetermined bimodal or multimodal size distribution, such that the nanoparticles may be deposited to take advantage of more efficient packing density. For example, a first sublayer of larger diameter particles 512 (such as 25 nm) may be deposited, and a second sublayer of smaller diameter particles 514 (such as 9 nm) may be deposited thereupon, with the smaller particles 514 preferentially sitting in the interstices defined by the larger diameter particles 512.

Figure 6:
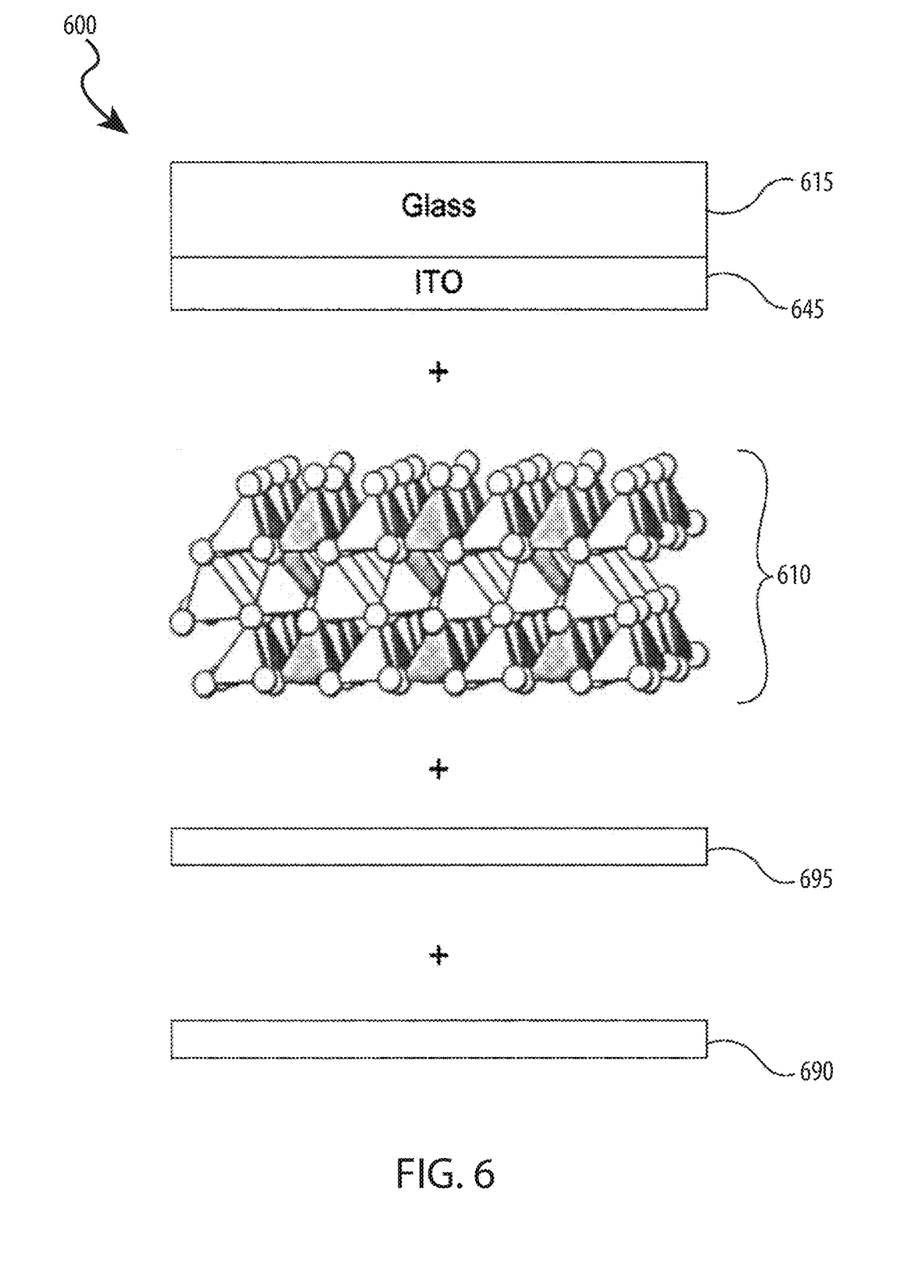
FIG. 6 is a diagram illustrating layers of a coated substrate comprising nanoparticles.

Referring now to FIG. 6, in some embodiments, a coated substrate 600 may include, in order, glass substrate 615 coated in indium tin oxide 645, a nanoparticle film 610, a film of conducting nanowires 695 (e.g., ZnO, MgO, or the like), and a metal backing layer 690. In some embodiments, the conducting nanowires 695 may be deposited onto the surface of the nanoparticles film 610 through vacuum evaporation or like techniques. The layer of conducting nanowires 695 may yield effects such as lower series resistance and/or increased electrical conductivity and increased in power discharge capabilities of the QED produced therewith. The film of conducting nanowires 695 may be in place of or in addition to the metal backing layer 690.

Figure 7:
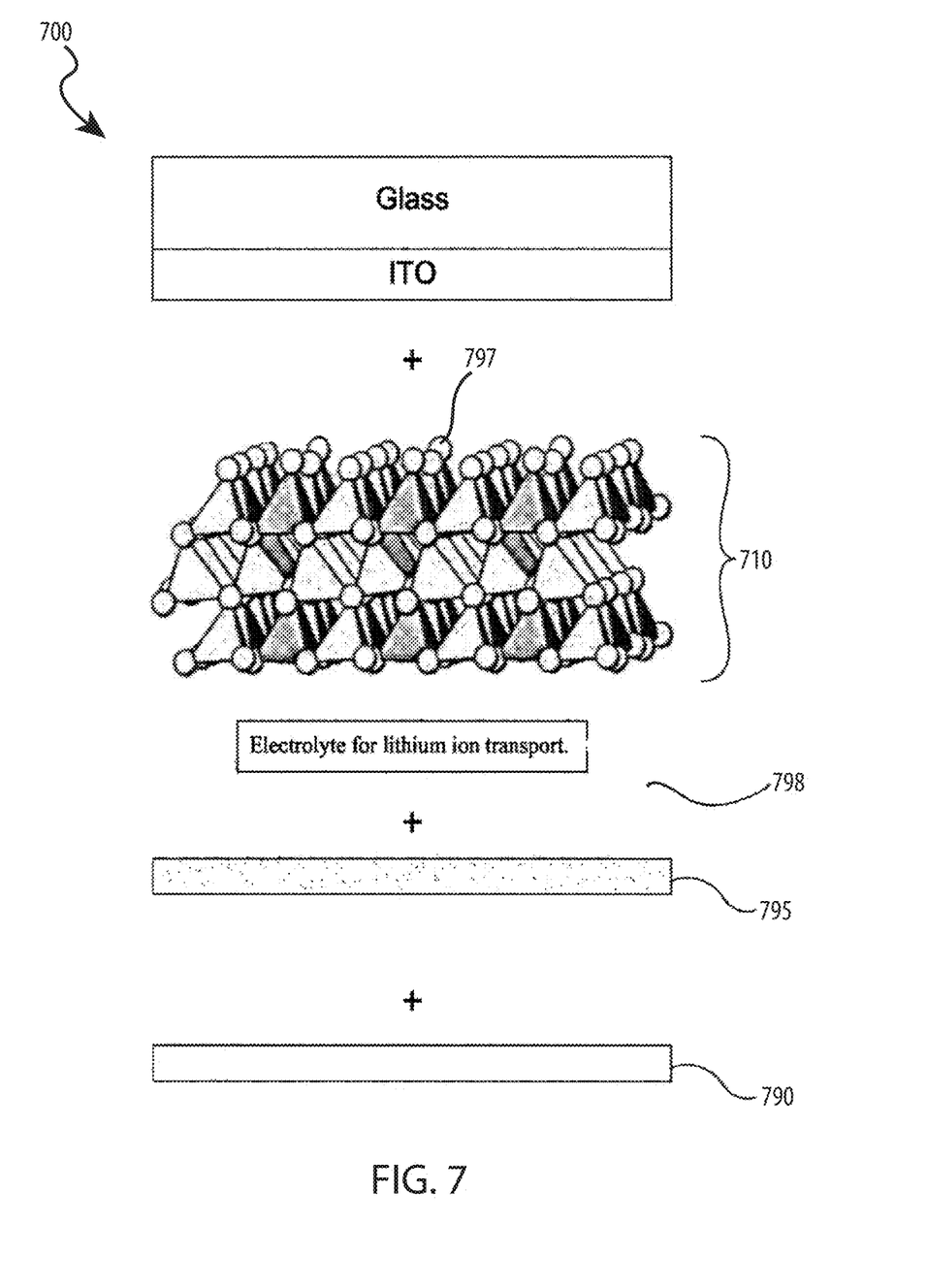
FIG. 7 is a diagram illustrating layers of a coated substrate comprising nanoparticles.

Referring now to FIG. 7, a coated substrate 700 may include, in order, an glass substrate coated in indium tin oxide, a nanoparticle film 710 having lithium 797 intercalated therein and an electrolyte 798 for lithium ion transport, a film of conducting nanowires 795 (e.g., ZnO, MgO, or the like), and a metal backing layer 790. Without being limited by theory, the strain manufactured into the strained nanoparticles may be further increased through intercalation of additional appropriately sized, small molecules, such as lithium, sodium, or the like. Intercalation is the typically reversible inclusion of a molecule between two other molecules. The intercalation of a small intercalation atom or ion, such as lithium, into the crystal lattice structures of strained nanoparticles may increase the internal stresses to further strain the nanoparticle structure and consequently increase the energy density and the power output capabilities of the a device produced therewith.

In some embodiments, the thickness of the nanoparticle films described herein may range from a lower limit of about 200 nm, 300 nm, or 500 nm to an upper limit of about 1500 nm, 1250 nm, or 1000 nm, and wherein the thickness may range from any lower limit to any upper limit and encompasses any subset therebetween.

In some embodiments, the nanoparticle films described herein may exhibit voltages ranging from a lower limit of about 0.1 V, 1 V, 2.5 V, or 5 V to an upper limit of about 18 V, 15 V, 12 V, or 10 V for a 1 cm² single layer nanoparticle film, and wherein the voltage may range from any lower limit to any upper limit and encompasses any subset therebetween. In some embodiments, the composition and physical properties of the nanoparticles may be tailored to achieve a desired voltage.

In some embodiments, the nanoparticle films described herein may exhibit currents ranging from a lower limit of about 10 microamps, 100 microamps, or 1 mA to an upper limit of about 50 mA, 25 mA, 10 mA, or 1 mA for a 1 cm² single layer nanoparticle film, and wherein the current may range from any lower limit to any upper limit and encompasses any subset therebetween.

A plurality of QED units have been successfully fabricated using the nanoparticle electrophoretic deposition method, described herein. The individual QED units may, in some embodiments, be wired together, in series or in parallel, to increase the total output voltage or current, respectively. The QED units manufactured with the nanoparticle films described herein have demonstrated the capability to power LEDs and other electronic devices with similar power requirements. Combinations of different sizes of nanoparticles and types of nanoparticles may be used to generate QED having specifically tailored and desired output characteristics. Multiple layers of nanoparticles may, in some embodiments, be utilized, and metal layers may optionally be interspersed or mixed between the nanoparticle layers. In some embodiments, metallic and non-metallic back or front contacts may be utilized, depending on the desired QED output.

In some embodiments, P-type or N-type doped semiconductor (i.e., non-intrinsically doped) nanoparticles may be utilized and/or mixed with intrinsic semiconducting nanoparticles, as desired.

Devices made from some nanoparticles described herein, e.g., quantum dot compositions (e.g., CdSe, Si, Ge, SiGe, and the like) may, in some embodiments, benefit from the unique and size-driven physical characteristics of these nanoparticles. Semiconductors are materials that conduct electricity, but only very poorly. Unlike metals, which have an abundance of free electrons capable of supporting electrical conduction, the electrons in semiconductors are mostly bound. However, some are so loosely bound that they may be excited free of atomic binding by the absorption of energy, such as from an incident photon. Such an event produces an exciton, which is essentially an electron-hole pair, the hole being the net-positively charged lattice site left behind by the freed electron. In most crystals, sufficient excitons may be created such that the freed electrons may be thought of as leaving the valence band and entering the conduction band. The natural physical separation between the electron and its respective hole varies from substance to substance and is called the exciton Bohr radius. In relatively large semiconductor crystals, the exciton Bohr radius is small compared to the dimensions of the crystal and the concept of the conduction band is valid. However, in nanoscale semiconductor crystals or quantum dots, the exciton Bohr radius is on the order of the physical dimension of the crystal or smaller, and the exciton is thus confined. This quantum confinement results in the creation of discrete energy levels and not a continuous band. Exploitation of this phenomenon, such as by coatings of nanoscale semiconductor crystals, can yield such devices as photovoltaic cells 'tuned' to specific wavelengths of photons to optimize energy transduction efficiency, rechargeable batteries, photodetectors, flexible video displays or monitors, and the like.

In some embodiments, the nanoparticles may be strained nanoparticles, which may impart a piezoelectric effect that distorts the electron cloud and gives rise to a voltage potential. Direct current electrical energy may then be utilized to power electrical devices.

To facilitate a better understanding of the present disclosure, the following examples of preferred or representative embodiments are given. In no way should the following examples be read to limit, or to define, the scope of the disclosure.

IV Examples

Example 1

Strained silicon nanoparticles were produced in a reactor similar to that described above in reference to FIG. 1 in the vertical configuration so illustrated. Tetraethylsilane and methanol were mixed to yield a precursor solution. The precursor solution was sonicated with an QSONICA MODEL Q700 sonicator (available from QSONICA) immersed therein at a frequency of about 22 kHz. An argon carrier gas flowing at about 1000 mL/min was used to transport the aerosolized precursor solution into the reaction zone (approximately 1 m in length), which was at about 850° C. The product stream was collected in methanol. The resultant nanoparticles were analyzed by transmission electron microscopy and x-ray diffraction.

Example 2

Strained silicon nanoparticles were produced in a reactor similar to that described above in reference to FIG. 1 in the vertical configuration so illustrated. Isobutylsilane was used as a precursor solution. The precursor solution was sonicated with an QSONICA MODEL Q700 sonicator (available from QSONICA) immersed therein at a frequency of about 20 kHz. A carrier gas flowing at about 16.67 cm³/s was used to transport the aerosolized precursor solution into the reaction zone (approximately 1 m in length), which was divided in to three zones having temperatures of about 850° C., 850° C., and 650° C., respectively. The product stream was then collected. The resultant nanoparticles were approximately 12 nm in diameter with a a value of 0.00165 and a strain of approximately +0.45 degrees in the 111 plane of the silicon crystal as determined by transmission electron microscopy and x-ray diffraction.

Example 3

Strained germanium nanoparticles were produced in a reactor similar to that described above in reference to FIG. 1 in the vertical configuration so illustrated. Tetraethylgermane was used as a precursor solution. The precursor solution was sonicated with an QSONICA MODEL Q700 sonicator (available from QSONICA) immersed therein at a frequency of about 20 kHz. A carrier gas flowing at about 16.67 cm³/s was used to transport the aerosolized precursor solution into the reaction zone (approximately 1 m in length), which was divided in to three zones having temperatures of about 750° C., 750° C., and 550° C., respectively. The product stream was then collected. The resultant nanoparticles were approximately 8 nm in diameter with a a value of 0.00142 and a strain of approximately +1.4 degrees in the 111 plane of the silicon crystal as determined by transmission electron microscopy and x-ray diffraction.

Example 4

Strained silicon-germanium nanoparticles were produced in a reactor similar to that described above in reference to FIG. 1 in the vertical configuration so illustrated. Isobutylsilane and tetraethylgermane ere used as a precursor solution. The precursor solution was sonicated with an QSONICA MODEL Q700 sonicator (available from QSONICA) immersed therein at a frequency of about 20 kHz. A carrier gas flowing at about 16.67 $cm^3$/s was used to transport the aerosolized precursor solution into the reaction zone (approximately 1 m in length), which was divided in to three zones having temperatures of about 800° C., 800° C., and 575° C., respectively. The product stream was then collected. The resultant nanoparticles were produced in a ratio of approximately 1:3 silicon to germanium with a σ value of 0.00149 and a strain of approximately +1.64 degrees in the 111 plane of the silicon crystal as determined by transmission electron microscopy and x-ray diffraction.

Example 5

Eighty milligrams of 9 nm silicon nanoparticles were suspended in 10 mL of 2-butanol to yield a colloidal suspension with a concentration of about 8 mg/mL of silicon nanoparticles in 2-butanol. 10 mL of reagent grade acetone was added to the colloidal suspension. 300 microL of 1-butyl-methylpyrrolidinium bis(trifluoromethylsulfonyl)imide was added to the colloidal suspension. The colloidal suspension was then heated to a temperature of about 40° C. A 1 cm×2 cm glass substrate coated with indium tin oxide and having a resistance of about 8 ohms/$cm^2$ was then connected to the cathode of a DC power supply and immersed 1 cm into the colloidal suspension. A carbon electrode was connected to the anode of the DC power supply and spaced in the suspension 1 cm from the glass substrate. A voltage potential of 4 volts was applied across the two electrodes and allowed to remain for 180 seconds so as to deposit a silicon nanoparticle film having a thickness of between about 500 nm and about 800 nm on the glass substrate area that was submersed in the colloid solution.

Example 6

Eighty milligrams of highly pure strained germanium nanocrystal particles, characterized by an average particle diameter of about 10 nm were suspended in a polar protic solvent, such as methanol, to yield a colloidal suspension. Oleyalamine was added to the colloidal suspension to assist in maintaining the germanium nanoparticles in suspension. The colloidal suspension was maintained at a temperature of between about 25° C. and about 40° C. A 1 cm×2 cm glass substrate coated with indium tin oxide and having a resistance of about 8 ohms/$cm^2$ was connected to the cathode of a DC power supply and immersed 1 cm into the colloidal suspension. A carbon electrode was connected to the anode of the DC power supply and spaced 1 cm from the glass substrate in the suspension. A voltage potential of between about 1.5 and about 7 volts was applied across the electrodes and allowed to remain for from about 180 seconds to about 5 minutes so as to deposit a germanium film on the glass substrate area that was submersed in the colloid solution.

Example 7

A thin film of a mixture of size specific semiconducting nanocrystals was deposited via electrophoretic deposition on indium tin oxide coated glass, as described in Examples 2 and 3 above. Typically, the nanocrystals are at least about 99.99999 percent pure, more typically at least about 99.999999 percent pure, and still more typically, at least about 99.9999999 percent pure. The substrate having the deposited thin film of nanocrystals was placed in a low oxygen environment at room temperature, and the substrate was then masked to define a desired back contact location. Next, using a thermal evaporator/vacuum coater or like device, the substrate was placed with the nanocoated side toward the material to be deposited, at a distance of approximately 1-5 cm. A high vacuum environment was formed around the substrate and an appropriate Voltage/Current combination is applied to vaporize the desired metal to be deposited. The vaporized metal was deposited onto the substrate to create a complete layer that is both protective and allows for electrical connections. In general, this deposition process may take from approximately 5 seconds to about 5 minutes, depending on the desired back contact thickness. Once the metal layer was deposited, the vacuum was removed and the film was allowed to return to a typical room temperature environment. The masking was then removed in a low oxygen environment, leaving the desired metal deposition pattern on the film. A voltmeter and/or ammeter was used to confirm that power was being supplied by the QED. Using standard electrical connection techniques, multiple films were connected in a series/parallel fashion to yield a device configured to generate the desired voltage/current supply configuration. A QED device was completed and configured to power a desired load.

Example 8

A suspension of strained silicon nanoparticles suspended in toluene in a concentration of approximately 1 mg/mL was used. The suspension includes a mixture of nanoparticle sizes with the majority of the nanoparticles being between approximately 10 nm and 150 nm in diameter. The suspension was sonicated to ensure a homogeneous mixture was obtained. Then, approximately 10 mL of homogenized suspension was added to a glass beaker. Approximately 10 mL of acetone was then added to the mixture. 300 microliters of 1-butyl -1-methylpyrrolidinium bis(trifluoromethylsulfonyl)imide 65 was also added to the mixture to define an admixture.

The admixture was then sonicated again to ensure homogeneity and heated to a temperature of 40° C. A magnetic stir bar was used during heating to facilitate an even temperature in the admixture and to ready the admixture for electrophoretic deposition ("EPD") as an EPD bath.

A conductive substrate of glass coated with indium tin oxide with an average resistance of 8 ohms/$cm^2$ and of dimensions of approximately 1 cm by 2.5 cm was cleaned with a spray of pressurized acetone and wiped clean. The conductive substrate was then attached to the negative lead (cathode) on the power supply. A high purity carbon electrode was attached to the positive lead (anode) on the power supply. The carbon electrode was inserted into the EPD bath.

The conductive substrate was then inserted into the EPD bath to a depth of approximately 1 cm with the conductive side facing the carbon electrode and separated by a distance of approximately 1 cm. The power supply was energized and approximately 4 volts and minimal/negligible current was applied for approximately 3 minutes. During the 3 minutes the nanocrystals were deposited onto the conductive substrate and were visually observed as the film grew thicker and become more opaque. The power supply was turned off and the conductive substrate was removed from the EPD bath.

After silicon nanoparticle application, lithium was deposited on to the film through electroplating of lithium acetate dissolved in a solution of dimethylacetamide (DMA). The silicon nanoparticle film was then submerged into the solution for electrophoretic deposition of lithium. Lithium ions were intercalated into the silicon crystal structures during EPD to define a device having increased charge density and enhanced recharging capabilities. The device was then set out to dry in a low oxygen environment at elevated temperature (about 110° C.). It should be noted that while convenient to increase drying rate, heat is not essential.

Within 3 hours, a metallic back contact was applied to prevent oxidation of the silicon thin film. A high purity aluminum metallic back contact was applied using a thermal evaporator to a thickness of approximately 200 nm. Masking tape, metal screens, and glass were used to control the location of the metallic back contact and to prevent the aluminum layer from shorting to the ITO coated glass.

After the aluminum layer was applied, the QED cell was complete and is ready for wiring to a desired electrical device. Great care was taken to not touch the cell area with the silicon nanocrystals film applied to prevent any shorting of the cell. A series and parallel circuit was then created using multiple cells that were produced in the same manner. Through this process, an array of QEDs were wired to generate over 3.7 volts and 50 mA. This array was then connected to a thin film transistor display screen and the device functioned as normal with the QED device supplying the electrical energy with the properties outlined in Table 1.

TABLE 1

Typical Properties of Silicon Film of 1 $cm^2$

| Volts | 1.5 |
|---|---|
| Amps | 0.005 |
| Watts | 0.0075 |
| Battery Life (hrs) | 48 |
| Watt-Hours | 0.36 |
| Kilowatt-Hours | 0.00036 |
| Megajoules (MJ) | 0.001296 |
| Grams of Si | 0.00018632 |
| Volts | 1.5 |
| Amps | 0.005 |
| Watts | 0.0075 |

TABLE 2

Energy Density Comparison

| arrayed QED | ~7000 MJ/Kg |
|---|---|
| alkaline | 0.59 MJ/Kg |
| lithium-ion rechargeable | 0.46 MJ/Kg |
| zinc-air | 1.59 MJ/Kg |
| nickel metal hydride | 0.36 MJ/Kg |

The energy density observed from the arrayed QED device was about 7000 MJ/Kg, several orders of magnitude higher than that of an alkaline cell, a lithium-ion battery, and the like, as illustrated in Table 2.

The particular embodiments disclosed above are illustrative only. The various methods described herein may be modified and practiced in different manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. Various embodiments disclosed herein may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method for manufacture of silicon and germanium nanoparticles comprising
aerosolizing a precursor solution using a sonicator at a frequency between 1 kHz and about 22 kHz in the presence of a flowing carrier gas to yield a reactant stream, the precursor solution comprising a volatile solvent and a nanoparticle precursor of silicon or germanium elemental compounds, or both;
heating the reactant stream within a first reaction zone at a first temperature above a boiling point of the volatile solvent;
heating the reactant stream in a second reaction zone at a second temperature to form a product stream comprising a plurality of strained silicon or germanium nanoparticles or silicon-germanium nanoparticles;
cooling the product stream in a third reaction zone at a third temperature, wherein
the first temperature is not greater than the second temperature and the third temperature is less than each of the first and second temperatures; and
passing the product stream through a collection liquid to collect the nanoparticles from the product stream.

2. The method of claim 1, wherein the carrier gas is an inert gas.

3. The method of claim 1, wherein the volatile solvent comprises at least one selected from the group consisting of methanol, ethanol, isopropanol, butanol, and any combination thereof.

4. The method of claim 1, wherein the nanoparticle precursor comprises an organometallic compound.

5. The method of claim 1, wherein the nanoparticle precursor comprises a Group IV compound.

6. The method of claim 1, wherein the first temperature above the boiling point of the volatile solvent is between about 500° C. and about 1200° C.

7. The method of claim 1, wherein heating the reactant stream involves passing the reactant stream through a tube furnace.

8. The method of claim 1, wherein the nanoparticles have a shifted crystal plane peak.

9. The method of claim 1, wherein the nanoparticles have a multimodal diameter distribution.

10. The method of claim 1, wherein the nanoparticles have an average diameter between about 3 nm and about 1000 nm.

11. The method of claim 1, wherein the nanoparticles have a diameter distribution with a standard deviation of ±about 0.5 nm to ±about 10 nm.

12. The method of claim 1 further comprising
continuously aerosolizing the precursor solution;
continuously replenishing the precursor solution; and
continuously replacing the collection liquid.

13. The method of claim 12 further comprising extracting the nanoparticles from the collection liquid.

14. The method of claim 12 further comprising continuously extracting the nanoparticles from the collection liquid.

15. The method of claim 12, wherein the nanoparticle precursor is in an organometallic compound.

16. The method of claim 12, wherein the nanoparticles have a shifted crystal plane peak.

17. The method of claim 12, wherein the nanoparticles have a multimodal diameter distribution.

* * * * *